United States Patent [19]

Strandjord et al.

[11] Patent Number: 5,426,013
[45] Date of Patent: Jun. 20, 1995

[54] OPTICAL RECORDING MEDIA CONTAINING UNIFORM PARTIALLY OXIDIZED METAL LAYER

[75] Inventors: Andrew J. G. Strandjord; Steven P. Webb, both of Midland, Mich.

[73] Assignee: The Dow Chemical Company, Midland, Mich.

[21] Appl. No.: 157,351

[22] Filed: Nov. 23, 1993

Related U.S. Application Data

[62] Division of Ser. No. 906,906, Jun. 30, 1992, Pat. No. 5,302,493.

[51] Int. Cl.⁶ ............................................... G11B 7/24
[52] U.S. Cl. ................................... 430/270; 430/495; 430/945; 369/288; 428/64
[58] Field of Search ................ 369/284, 288; 430/945, 430/270, 495; 204/192.26, 192.27; 428/64

[56] References Cited

U.S. PATENT DOCUMENTS

| | | | |
|---|---|---|---|
| 4,091,171 | 5/1978 | Ohta et al. | 428/539 |
| 4,385,376 | 5/1983 | Takaoka et al. | 369/284 |
| 4,500,889 | 2/1985 | Wada et al. | 346/1.1 |
| 4,548,889 | 10/1985 | Nemoto et al. | 430/273 |
| 4,636,806 | 1/1987 | Watasai et al. | 346/1.1 |
| 4,640,860 | 2/1987 | Ritchie | 428/143 |
| 4,703,139 | 10/1987 | Dunlap | 200/76 |
| 4,775,568 | 10/1988 | Itoh et al. | 428/64 |
| 4,786,538 | 11/1988 | Saito et al. | 428/64 |
| 4,935,336 | 6/1990 | Yamada et al. | 430/495 |
| 4,981,772 | 1/1991 | Pan et al. | 430/346 |
| 4,998,239 | 5/1991 | Standjord et al. | 369/275.01 |
| 5,045,373 | 9/1991 | Sens et al. | 428/64 |
| 5,100,700 | 3/1992 | Ide et al. | 428/64 |
| 5,271,978 | 12/1993 | Vazan et al. | 428/64 |

FOREIGN PATENT DOCUMENTS 58-007394  1/1983  Japan ................................. 430/945

*Primary Examiner*—Charles L. Bowers, Jr.
*Assistant Examiner*—John A. McPherson
*Attorney, Agent, or Firm*—Bruce M. Kanuch

[57] ABSTRACT

An optical memory storage medium based on a partially oxidized deposited layer of soft metal alloy is described. A method of preparing the medium by vacuum depositing the soft metal alloy layer in the presence of controlled amounts of gaseous oxidant to thereby form the layer in a uniform partially oxidized form.

5 Claims, 1 Drawing Sheet

OPTICAL RECORDING MEDIA CONTAINING UNIFORM PARTIALLY OXIDIZED METAL LAYER

CROSS-REFERENCE TO RELATED APPLICATION

This is a division of application Ser. No. 07/906,906, filed Jun. 30, 1992, now U.S. Pat. No. 5,302,493.

BACKGROUND OF THE INVENTION

The present invention relates generally to materials for storage of coded information and methods of fabricating such materials, and more particularly to such materials which are designed specifically for optical information storage and their production.

BACKGROUND INFORMATION

Optically retrievable information storage systems have been commercially available for some time in the form of video discs and audio discs (more commonly referred to as compact discs, i.e., CDs). More recently, systems in other formats such as optical tape (Gelbart U.S. Pat. No. 4,567,585) and data information cards like those developed by Drexler Technology Corporation, Mountain View, Calif. (Drexler U.S. Pat. No. 4,544,835) are beginning to attract commercial attention.

Information carriers or storage media such as video discs and audio discs are often referred to as read-only memories (ROM). The information is typically stored as extremely small structural relief features which are permanently molded into the substrate during the manufacturing process. Optical retrieval of such data is typically accomplished through differential reflection techniques using a laser light source.

In addition to ROM media, both write-once media and write-read-erase systems have been recently introduced into the marketplace in disc, card, and tape formats. Typically, these systems utilize a diode laser to both "read" and "write" coded information from and to the medium. Data can be of several forms: that which includes some permanent prerecorded data (similar to ROM) in addition to that which can be permanently formed by the laser through direct or indirect interaction by the user (write-once); that in which all the information is recorded by the laser; or that which can be interactively formed and removed by the laser (write-read-erase).

Write-once applications for optical information storage are often referred to as "direct-read-after-write" (DRAW) or more recently, "write-once-read-many" (WORM) media. In this application, the optical storage medium (disc, card or tape) may be already preformatted with the appropriate tracking and associated access information. Some of the media incorporate suitably reflective and active layers into a multilayered structure.

Functionally, the basic performance criteria associated with these different media formats are very similar, the most important of which are data input sensitivity and archival stability. Information is stored in the write-once systems as micron-sized optically readable "spots". These spots can be created in a thin absorbing layer above the reflective metal layer or can be formed directly in the metal layer within the medium using a focused laser beam as the writing source (pulsed, high power). The data is "read" by scanning the laser (CW, low power) back over the spots and monitoring the intensity of the reflected laser light Information can be placed on these optical memories in extremely high densities, the theoretical limit being determined by the absolute resolving power of a laser beam focused down to its diffraction-limited size ($\lambda/2NA$, wherein $\lambda$ is the wavelength of the laser and NA is the numerical aperture of the focusing beam optics). Presently, most write and read lasers being employed operate within a wavelength range of 780 to an 830 nm. However, in order to increase memory density, shorter wavelength (down to 300 nm or less wavelengths) are being tested throughout the industry. The information stored in these write-once media is, in principle, capable of being optically accessed an infinite number of times.

Mechanically, there are differences between the tape, disc and card formats which make it difficult for one thin-film system to work as a universal write-once active layer. For example, discs which are based on alloys of tellurium, selenium and/or their oxides have been developed as ablative write-once media using conventional sputtering technology. These discs are typically put together in a rigid, air-sandwiched construction to enhance environmental stability while maintaining compatibility with the ablative writing mechanism (i.e., the writing laser beam directly melts away the metal layer to form the information spot).

Tape, on the other hand, is a nonrigid medium and must be flexible enough to accommodate motion around the small hubs and rollers associated with tape handling. Additionally, because tape is in constant frictional contact with itself and the roller mechanisms, optical tape must be abrasion resistant. This protection is best afforded by some type of thin film hard overcoat. However, this hard overcoat in direct contact with the active layer renders the active layer less sensitive to laser writing.

Cards, which traditionally have been considered low-end media, require many of the criteria associated with both tape and disc formats. Like discs, cards are functionally rigid media. When they are in the optical drive the media do not experience any of the same frictional or bending forces associated with tape media. However, outside the drive, the media must be able to withstand the forces associated with external handling and storage by the consumer. Surface abrasion and bending are commonplace for media used in credit card applications.

There are other differences and similarities which exist between the three media formats, but due to the variety of potential thin-film layers being developed as write-once media and the large number of diverse drive designs, many of the precise requirements for these three types of media are still in the process of being standardized. For example, media performance standards such as write sensitivity, carrier-to-noise ratio (CNR), data bit size, and reflectivity level will be dependent on the end-use for the specific system. No one thin-film system has been able to meet all the criteria which are required to make the media compatible with the various media drives.

As noted above, tellurium and selenium alloys are among materials that have been used heretofore. The reflective layer can be deposited by sputtering, vacuum evaporation, chemical plating or the like. In some cases, this reflective layer (film) is overcoated with one or more semitransparent or transparent polymer layers.

In 1991, U.S. Pat. No. No. 5,016,240 described the use of a highly reflective soft metal alloy reflective metal layer for information storage. The soft metal alloy is flexible and can be manufactured into any of the three formats, tapes, cards or discs. Representative techniques for depositing layers of this alloy include vacuum evaporation and sputtering.

SUMMARY OF THE INVENTION

The present invention provides an improvement in the use of soft metal alloys in optical recording media and in the manufacturing of layers of this alloy in such media.

The present invention offers improved optical memory storage media based on soft metal alloys and an improved vacuum deposition method of fabricating the same. The present invention utilizes an oxidant-containing atmosphere in a vacuum deposition process to produce an optical memory storage medium with enhanced properties, i.e., less surface inhomogeneities, less phase segregation of the alloy, improved laser write sensitivity, improved environmental stability (oxidation and moisture resistance), lower noise characteristics, improved signal, improved carrier-to-noise level and improved modulation depths. The oxidant present in the sputtering gas atmosphere is an oxygen-containing gaseous species, such as oxygen gas, water vapor, carbon dioxide, nitrogen oxide, or the like.

The medium which results is characterized by having the soft metal alloy present as a partial oxide.

BRIEF DESCRIPTION OF THE DRAWINGS

This invention will be further described with reference being made to the accompanying drawings, in which.

DESCRIPTION OF THE PREFERRED EMBODIMENTS

Figure 1:
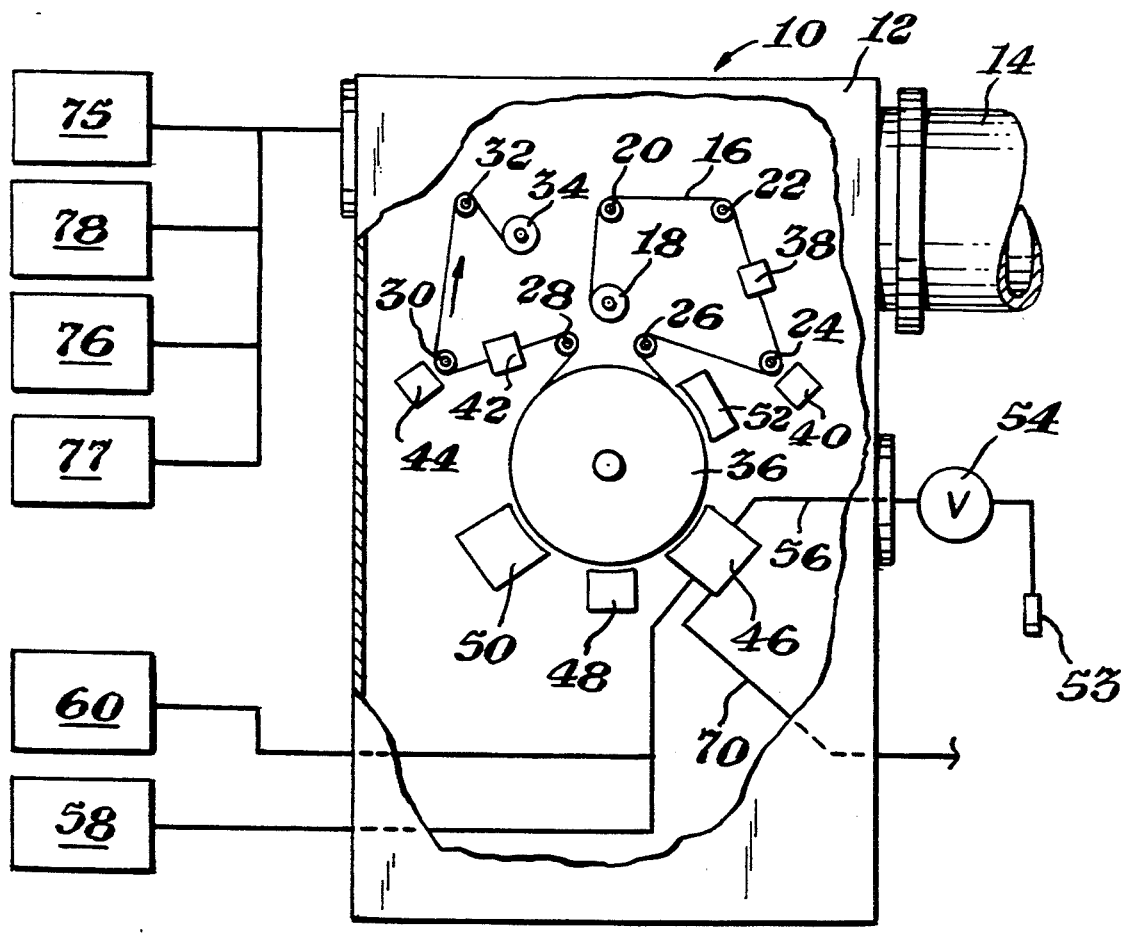
FIG. 1 is a schematic cross-section of a magnetron sputtering machine capable of producing the products of this invention.

The present optical recording media include a substrate having a thin film of a flexible metal alloy adhered to one or both sides wherein the alloy is present in a uniform, partially oxide form. By partial oxide is meant that not all of the metal atoms have been converted to their oxide form.

Any material normally used for substrates for making optical media known in the art can be used. For example, the substrates can be selected from solid materials such as rigid or reinforced plastic or glass or can be a flexible plastic or additionally any of the above classes of substrate with a subbing layer adhered to the surface(s) to be coated.

Examples of representative plastic media include polyester films, especially polyethylene terephthalate (PET), polycarbonate, polyacrylate, polymethylmethacrylate, polystyrene, polyurethane, polyvinylchloride, polyimide and the like.

Polyester, and especially polyethylene terephthalate, and polycarbonate are preferred plastics because of their hardness, clarity and scratch-resistance.

Examples of representative subbing layers include UV-cured acrylics, siloxanes, Teflon®, $SiO_2$ and the like. UV-cured acrylics are preferred subbing layers because they cause no decrease in performance of the media and improve the adhesion of the metal layer to the substrate.

The substrates can be in a form suitable for forming discs, cards or tapes. This is generally in film or sheet form ranging in thickness from about 0.5 mil to about 60 mil.

The metal layer is a highly reflective soft metal alloy which is partially oxidized. The highly reflective soft metal alloy comprises at least 5% by weight of each of at least two metals selected from the group consisting of cadmium, indium, tin, antimony, lead, bismuth, magnesium, copper, aluminum, zinc and silver.

As examples (all are percent by weight), the metal alloy can comprise of about 5 to about 95% tin, about 5 to about 95% bismuth, and 0 to about 40% copper, about 5 to about 95% tin, about 5 to about 95% bismuth and 0 to about 49.9% silver; about 5 to about 95% cadmium, about 5 to about 95% zinc and 0 to about 49.9% silver; about 5 to about 95% zinc, about 5 to about 95% cadmium and 0 to about 10% magnesium; about 5 to about 95% bismuth, about 5 to 95% cadmium and 0 to about 49.5% silver; about 0.1 to about 95% tin and about 5 to about 99.9% of indium; about 5 to about 95% tin, about 5 to about 95% lead, and 0 to about 40% copper; about 5 to about 95% tin, 5 to 95% lead and 0 to 49.9% silver; about 40 to about 94% tin, about 3 to about 30% antimony, about 3 to about 37% bismuth and 0 to about 40% copper; at least about 8% tin, at least about 8% bismuth and at least one of Mg, Au, Fe, Cr, Mn, Cu, Ag and Ni(at least about 1%) wherein Bi is present in an amount greater than any of Mg, Au, Fe, Cr, Mn, Au, Ag and Ni. Layering materials having these compositions are defined herein as "soft metal layers," "soft metal alloy layers," and "flexible metal alloy layers." A preferable alloy is made up of about 25 to about 90% tin, about 8 to about 60% bismuth and about 1 to 25% copper.

Soft metal alloys which comprise predominantly tin, i.e., 55–80%; a major amount of bismuth, i.e., 20–35%; and an amount of copper, i.e., about 1 to about 10% can be used. The partial oxide of an alloy composed of about 70 to about 75% tin, about 20 to about 25% bismuth and from about 1 to about 5% by weight copper is preferred.

The soft metal alloy layer is present in a uniform partially oxidized form. By "uniform" is meant that the degree of oxidation is substantially constant at any selected depth below the surface and that the degree of oxidation generally decreases as a function of this depth. This is because the surface oxygen content of the film can go up when the product is removed from the vacuum chamber and exposed to atmospheric oxygen.

Oxidation levels in the film are difficult to arrive at by mass balancing the added oxygen during oxidation deposition because the vacuum system is constantly removing gas (including the gaseous oxidants employed herein) to some extent from the sputtering zone.

When a metal alloy layer is laid down without added oxidant, removed and equilibrated in air, it appears there is about 0.5 to about 0.6 atoms of oxygen present for each atom of tin (when tin is one of the components). Conversely, when too great a level of oxidant is present, there is about 0.7 to about 0.8 atoms of oxygen per atom of tin. These ranges would appear to suggest a very narrow band of acceptable oxygen levels. It is believed that useful levels of partial oxidation are broader than this range would suggest. In light of the extreme difficulties posed in determining and comparing these numbers accurately, it is considered that one way to define oxidation levels is not by chemical constituency but rather by the optical and performance properties of the metal alloy films.

One indirect measure of oxidation level in these thin films of the present invention is reflectivity measured in situ in the vacuum chamber before exposure of the film to atmospheric oxidation. At high oxidation levels, the metal layer appears brown and reflectance at 830 nm drops below useful levels. Suitable oxidation levels diminish the 830 nm reflectance of the film, as compared to film prepared under the same conditions without oxidant. Suitable levels of oxidation are achieve when the ratio of $$\frac{\text{830 nm reflectance (with oxidant)}}{\text{830 nm reflectance (without oxidant)}}$$

ranges between about 0.50 and about 0.95, and especially between about 0.60 and about 0.85.

Another observable characteristic of the partially oxidized soft metal layer (when at a suitable level of oxidation) is a film surface free of dendrites particularly bismuth-rich dendrites (when bismuth is one of the metals in the alloy), and nodules which are generally observed when no oxidation takes place during deposition. This can be observed by comparing micrographs of the film surface without oxidation with the micrographs of the film when in the partially oxidized form.

Yet another observable characteristic of the partially oxidized soft metal layer (when at a suitable level of oxidation) is a film surface made up of uniform grain size particles with a mean diameter of less than about 250 Å. More specifically, typically at least 80% of the particles are sized within ±25% of the mean diameter with that mean being below about 250 Å, especially from about 100 Å to about 200 Å.

The partially oxidized soft metal alloy layer is from about 75 Å in thickness to about 5,000 Å in thickness, preferably from about 100 Å to about 1,500 Å, and often from about 350 Å to about 1000 Å.

The soft metal alloy is laid down in a thin layer on the substrate by vacuum deposition, e.g., sputter-depositing, in an atmosphere containing an oxidizing species. This oxidizing species is preferably water or oxygen. The oxidizing species is added to the inert sputtering gas atmosphere (e.g., argon) to a level such that the deposited alloy film shows the above defined favorable characteristics, e.g., no dendrites and a reflectivity at the desired level.

Sputter depositing is a commercial process for depositing inorganic materials, metals, oxides and the like, on surfaces. Representative descriptions of sputter depositing processes and equipment may be found in U.S. Pat. Nos. 4,204,942 and 4,948,087 which are incorporated by reference. A schematic view of a representative sputtering system is provided in FIG. 1 and will be described in and prior to Example I.

In sputtering, a voltage is applied to a sputtering cathode in the presence of a reactive and/or nonreactive gas to create a plasma. The action of the sputtering gas plasma on the cathode causes atoms of the cathode (source) to be dislodged and to travel to and deposit upon a substrate positioned adjacent to the sputtering source.

Typically, the non-reactive sputtering gas is a noble gas such as krypton or argon or the like. Argon is the most common sputtering gas because of its attractive cost.

It is also known in the art to employ a reactive gas as a component of a sputtering gas mixture but not for the purpose of the subjects invention. When a reactive gas is present it can cause a metal to be deposited as an oxide (when an oxygen source is present), a nitride (when a nitrogen source is present) and the like. This reactive sputtering process is well known and used commercially.

As applied to the present invention, the soft metal alloy is deposited using a sputtering gas which includes an oxygen source, i.e., an oxidative sputtering gas.

The gaseous oxygen source can be oxygen gas ($O_2$), water vapor, carbon dioxide, a nitrogen oxide such as $NO_2$ or a mixture of these materials. Water and oxygen gas have worked well.

The relative proportion of oxygen source to noble sputtering gas ranges from about 0.1 to about 2.0 parts by volume oxygen source to each part of noble gas and especially 0.3 to about 1.0 parts of oxygen source per part of noble sputtering gas.

This invention will be further described with reference to the accompanying examples and comparative experiments. These are provided to illustrate the invention but are not to be construed as limiting its scope.

These experiments were all carried out in a continuous sputtering machine. The sputtering equipment used was a research-sized coater for 13.5-inch-wide web. A simplified schematic of the web coating system is shown as System 10 in FIG. 1. System 10 includes vacuum chamber 12 which is evacuated via line 14. Contained within chamber 12 is a drive mechanism for moving a sheet of flexible plastic substrate 16 past a series of magnetron sputtering stations 50, 48, and 46. The drive mechanism includes feed roll 18, idlers 20, 22, 24, 26, 28, 30 and 32 and take-up roll 34.

The film passes around chilled idler drum 36 as well. The film passes a pair of monitors for determining its transmittance, 38, and reflectance, 40, before coating and a similar pair of monitors 42 and 44 after coating. This coater is configured to sputter coat simultaneously up to three layers on a 13.5-inch-wide web using three separate DC magnetron cathodes 46, 48 and 50. Also located in the system is a pre-glow station 52 for ionized gas cleaning or surface modifying of the substrate before coating. Each of these four stations is isolated from each other in space as a mini-chamber; thereby producing a local environment for the containment of the plasma gasses. This allows separate processes to be carried out simultaneously at each station without cross-contamination between the four sources (see FIG. 2). Mini-chamber 46 is equipped with a manifold for distributing oxidant gas such as water vapor or oxygen, supplied from vessel 53 via valve 54 and line 56.

Figure 2:
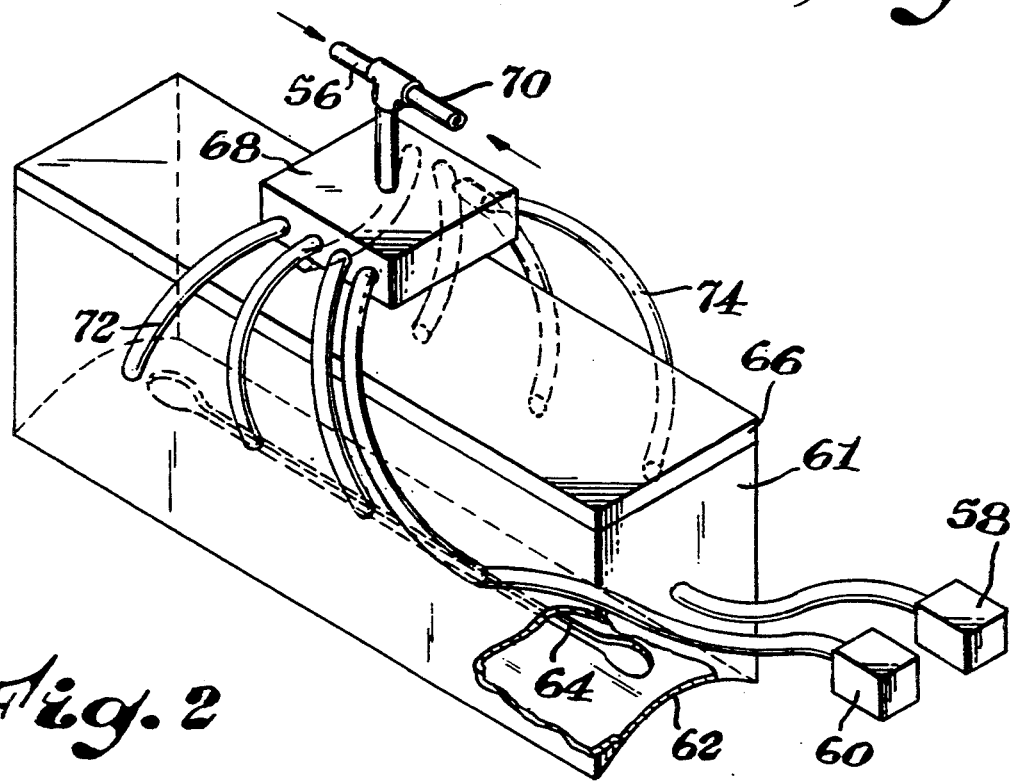
FIG. 2 is a cut-away perspective view of a sputtering cathode minichamber useful in a sputtering machine as depicted in FIG. 1.

As shown in FIG. 2, a mini-chamber such as 46 includes a housing 61 with a curved side 62 which conforms to the contour of idler drum 36 (FIG. 1). This side 62 contains a slit 64 through which the sputter deposited alloy is conveyed onto the substrate that moves past it. The mini-chamber 46 has a cathode 66 made of the soft metal alloy and a manifold 68 which mixes sputtering gas (Ar) from line 70 and water vapor or oxygen from line 56 and distributes this mixture in its sputtering zone via line 72-74, etc.

The control and monitoring of the sputtering system are normally accomplished using equipment and sensors which are standard in this coating machine. These are shown in FIG. 1 and include: 75, mass flow controllers (MKS) for regulation of gas flow into the cathode minichambers; 76, 5-10 kilowatt DC power supplies (Advanced Energy) for all three sputtering cathodes; 77, an optical monitoring system (Hexatron/Southwall Technologies) which measures both reflectance and transmission of the film over the spectral region from 300 to 2000 nm; and 78, a film motion control system (Drivex) which regulates the tension, speed, and distance of the film as it moves through the system.

In addition to this equipment, the chamber 46 was fitted with an optical emission spectrometer (OES) 60 and a residual gas analyzer (RGA) 58 for in situ monitoring of the composition of the gas species in the plasma (see FIGS. 1 and 2).

The process parameters are equipment sensitive and may vary from equipment to equipment and even on the same equipment from day to day. Thus, before making the media of the present invention, the equipment should be calibrated before use.

The experiments were carried out using the following protocol for experimental sample preparation:
1) the chamber was setup:
   a) a plastic (usually PET) substrate film was loaded into the chamber,
   b) the chamber was evacuated to $1-2 \times 10^{-5}$ Torr,
   c) the argon gas flow rate was set,
   d) the oxidant gas valve was opened to give a desired ratio of argon to oxidant source, with oxygen being the common oxidant source,
   e) the film reels were set in motion,
   f) the pre-glow station was turned on,
   g the cathode power was set and turned on,
2) the system was allowed to equilibrate for a period of time,
3) 10 to 20 feet of film was coated with the soft metal alloy,
4) the power to the cathode was turned off for a short period of time to leave a "blank" region on the film as a marker to identify the end of "sample",
5) new system parameters were set (1c-g),
6) the plasma was then reignited and the cycle repeated (2-6) until the film was used up or the experiments were complete, and then
7) the film was removed from the vacuum chamber and cut into sections for analysis.

Using the protocol outlined above, a set of preparations were carried out to demonstrate the effect of oxidant source and amount on the soft metal alloy sputtering process and products. Films of varying reflectivities were made at different oxidant levels.

COMPARATIVE EXAMPLES

The tables set forth herein reflect the equipment and process parameters (Table 1a and 2a) and the properties of the media (Tables 1b and 2b).

The first series of films was made at varying film reel speeds with no oxidant added to the system. These experiments were used as a base-line in which to compare materials prepared in accordance with the invention. Six samples at varying reflectivity levels were made in this series from a high of ~82% down to 50%. This corresponds to reel speeds of 5 mm/sec and 30 mm/sec, respectively (see Tables 1a and 1b Samples 1-6).

In these experiments the sputtering target (5"×15.5"×0.25") comprised an alloy, in percentage by weight, of Sn (about 65 to about 80), Bi (about 13 to about 30), and Cu (about 1 to about 7). The alloy composition may have varied within these limits from test to test. The substrate was 3 mil PET (ICI 393) film. In the six samples, the chamber was evacuated to about a pressure of $2 \times 10^{-5}$ Torr, then back-filled with argon gas to a pressure of about $1.07 \times 10^{-3}$ Torr. A DC power of 1000 watts at 593 volts and 1.64 amps was applied to the magnetron sputtering source. The substrate was translated in front of the sputtering source at different rates to coat the soft metal alloy onto the substrate at different thicknesses.

The reflectance light write threshold, modulation depth and carrier-to-noise level are set forth in the Table 1b.

Bismuth-rich dendrites were present on all of the medium surfaces. These features resulted in inhomogeneities in reflectivity, laser write sensitivity, modulation depth, and carrier-to-noise level.

Examples of the Invention (H₂O Vapor)

A 13.5-inch wide web coating machine was used to sputter deposit the soft metal alloy onto polymeric substrate materials. The sputtering target (5"×15.5"×0.25") consisted of the same alloy composition as described above. The substrate was 3 mil PET film. The chamber was evacuated to about a pressure of $1 \times 10^{-5}$ Torr, then back-filled with argon gas to a pressure of about $1.07 \times 10^{-3}$ Torr, and then with water vapor to a total pressure as shown in the Table 1a. A DC power was applied to the magnetron sputtering source. The substrate was translated in front of the sputtering source at a rate shown in the Table 1a so as to allow for a coating of the alloy to be deposited onto the substrate.

The resulting medium had a reflectance, a modulation depth and a carrier-to-noise level as shown in Table 1b. The media surfaces were homogeneous.

Examples of the Invention (Oxygen as Oxidizing Gas)

Another series of Examples were run as described above except O₂ was used instead of H₂O. These Examples are set forth in Tables 2a and 2b. The surfaces of these media were also homogeneous.

TABLE 1a

| | | | Process Parameters | | | |
|---|---|---|---|---|---|---|
| Sample # | Power (Watts) | Reel Speed (mm/sec) | Mini-Chamber Pressure (mTorr) | Water Flow Micrometer Setting | In Situ Reflectivity (% at 830 nm) | In Situ Transmission (% at 830 nm) |
| 1 | 1000 | 5 | 1.03 | 0 | 82.8 | 0.0 |
| 2 | 1000 | 10 | 1.02 | 0 | 78.1 | 2.2 |
| 3 | 1000 | 15 | 1.02 | 0 | 70.1 | 6.0 |
| 4 | 1000 | 20 | 1.06 | 0 | 62.5 | 10.3 |
| 5 | 1000 | 25 | 1.03 | 0 | 55.3 | 15.0 |

TABLE 1a-continued

| | | | Process Parameters | | | |
|---|---|---|---|---|---|---|
| Sample # | Power (Watts) | Reel Speed (mm/sec) | Mini-Chamber Pressure (mTorr) | Water Flow Micrometer Setting | In Situ Reflectivity (% at 830 nm) | In Situ Transmission (% at 830 nm) |
| 6 | 1000 | 30 | 1.02 | 0 | 48.0 | 19.7 |
| 7 | 1000 | 5 | 1.03 | 10 | 81.5 | 0.0 |
| 8 | 1000 | 10 | 1.03 | 10 | 78.5 | 1.9 |
| 9 | 1000 | 15 | 1.03 | 10 | 71.3 | 5.5 |
| 10 | 1000 | 20 | 1.05 | 10 | 63.4 | 9.6 |
| 11 | 1000 | 25 | 1.07 | 10 | 56.0 | 14.4 |
| 12 | 1000 | 30 | 1.09 | 10 | 49.4 | 18.9 |
| 13 | 1000 | 5 | 1.05 | 20 | 80.8 | 0.0 |
| 14 | 1000 | 10 | 1.06 | 20 | 78.5 | 2.1 |
| 15 | 1000 | 15 | 1.09 | 20 | 70.6 | 6.0 |
| 16 | 1000 | 20 | 1.11 | 20 | 61.5 | 10.8 |
| 17 | 1000 | 25 | 1.11 | 20 | 53.4 | 15.5 |
| 18 | 1000 | 30 | 1.13 | 20 | 46.2 | 20.5 |
| 19 | 1000 | 5 | 1.13 | 30 | 78.3 | 0.0 |
| 20 | 1000 | 10 | 1.14 | 30 | 76.3 | 2.1 |
| 21 | 1000 | 15 | 1.16 | 30 | 68.4 | 6.4 |
| 22 | 1000 | 20 | 1.17 | 30 | 59.5 | 11.8 |
| 23 | 1000 | 25 | 1.18 | 30 | 50.5 | 17.0 |
| 24 | 1000 | 30 | 1.21 | 30 | 44.1 | 22.4 |
| 25 | 1000 | 5 | 1.23 | 40 | 65.2 | 0.3 |
| 26 | 1000 | 2.5 | 1.21 | 40 | 48.3 | 0.0 |
| 27 | 1000 | 5 | 1.21 | 40 | 61.9 | 0.4 |
| 28 | 1000 | 10 | 1.23 | 40 | 72.1 | 2.9 |
| 29 | 1000 | 15 | 1.24 | 40 | 66.5 | 6.7 |
| 30 | 1000 | 20 | 1.25 | 40 | 57.7 | 11.7 |
| 31 | 1000 | 25 | 1.28 | 40 | 49.3 | 16.8 |
| 32 | 1000 | 30 | 1.26 | 40 | 43.5 | 21.6 |
| 33 | 1000 | 2.5 | 1.27 | 50 | 42.1 | 0.0 |
| 34 | 1000 | 5 | 1.27 | 50 | 59.2 | 0.4 |
| 35 | 1000 | 10 | 1.28 | 50 | 68.9 | 3.2 |
| 36 | 1000 | 15 | 1.32 | 50 | 63.1 | 7.4 |
| 37 | 1000 | 20 | 1.32 | 50 | 55.6 | 11.8 |
| 38 | 1000 | 25 | 1.34 | 50 | 48.5 | 16.7 |
| 39 | 1000 | 2.5 | 1.54 | 75 | 44.5 | 0.0 |
| 40 | 1000 | 5 | 1.54 | 75 | 55.9 | 1.1 |
| 41 | 1000 | 10 | 1.54 | 75 | 60.9 | 5.9 |
| 42 | 1000 | 15 | 1.55 | 75 | 55.8 | 9.7 |
| 43 | 1000 | 20 | 1.57 | 75 | 49.7 | 14.1 |
| 44 | 1000 | 2.5 | 1.72 | 100 | 52.7 | 0.1 |
| 45 | 1000 | 5 | 1.72 | 100 | 55.7 | 2.5 |
| 46 | 1000 | 10 | 1.73 | 100 | 58.1 | 8.9 |
| 47 | 1000 | 15 | 1.77 | 100 | 50.7 | 14.5 |
| 48 | 1000 | 20 | 1.77 | 100 | 43.6 | 20.0 |
| 49 | 200 | 2.2 | 1.54 | 60 | 52.0 | 15.9 |
| 50 | 200 | 2 | 1.64 | 70 | 50.3 | 18.3 |
| 51 | 200 | 1.5 | 1.76 | 80 | 48.7 | 20.1 |
| 52 | 500 | 8 | 1.43 | 60 | 51.9 | 13.1 |
| 53 | 500 | 7 | 1.52 | 70 | 51.5 | 13.7 |
| 54 | 500 | 6 | 1.60 | 80 | 52.6 | 14.1 |
| 55 | 500 | 5 | 1.68 | 90 | 53.9 | 14.3 |
| 56 | 1000 | 19 | 1.42 | 60 | 53.5 | 11.6 |
| 57 | 1000 | 17 | 1.47 | 70 | 54.6 | 10.5 |
| 58 | 1000 | 17 | 1.55 | 80 | 53.1 | 11.5 |
| 59 | 1000 | 15 | 1.50 | 90 | 53.6 | 11.3 |
| 60 | 1500 | 32.5 | 1.35 | 60 | 53.6 | 13.6 |
| 61 | 1500 | 30 | 1.47 | 70 | 53.3 | 12.8 |
| 62 | 1500 | 28 | 1.57 | 80 | 52.0 | 12.5 |
| 63 | 1500 | 25 | 1.64 | 90 | 53.6 | 11.2 |

TABLE 1b

| | Optical Measurements at 830 nm | | | | | |
|---|---|---|---|---|---|---|
| | Static | | | Laser Write | Dynamic | |
| Sample # | Reflectivity (%) | Transmission (%) | Absorption (%) | Sensitivity (nanoseconds) | Modulation Depth (%) | Carrier-to-Noise (dBs) |
| 1 | 80.59 | 0.02 | 19.22 | 160000 | 0.0 | — |
| 2 | 75.61 | 2.41 | 21.98 | 8000 | 0.0 | — |
| 3 | 67.57 | 6.28 | 26.15 | 1600 | 0.0 | — |
| 4 | 58.28 | 11.39 | 30.33 | 540 | 0.0 | — |
| 5 | 49.15 | 18.01 | 32.84 | 340 | 52.3 | 37 |
| 6 | 40.60 | 24.65 | 34.76 | 240 | 64.7 | 43 |
| 7 | 80.34 | 0.02 | 19.49 | 110000 | 0.0 | — |
| 8 | 75.64 | 1.96 | 22.40 | 9000 | 0.0 | — |
| 9 | 68.54 | 5.72 | 25.74 | 3000 | 0.0 | 3 |

TABLE 1b-continued

| | Optical Measurements at 830 nm | | | | | |
|---|---|---|---|---|---|---|
| | Static | | | Laser Write | Dynamic | |
| Sample # | Reflectivity (%) | Transmission (%) | Absorption (%) | Sensitivity (nanoseconds) | Modulation Depth (%) | Carrier-to-Noise (dBs) |
| 10 | 59.85 | 10.65 | 29.50 | 7000 | 0.0 | 6 |
| 11 | 49.91 | 17.10 | 32.99 | 340 | 36.4 | 28 |
| 12 | 41.59 | 23.10 | 34.83 | 270 | 57.1 | 41 |
| 13 | 77.57 | 0.18 | 22.24 | 32000 | 0.0 | — |
| 14 | 75.53 | 2.20 | 22.27 | 4000 | 0.0 | — |
| 15 | 66.49 | 6.43 | 27.08 | 1000 | 0.0 | 5 |
| 16 | 56.91 | 11.82 | 31.26 | 550 | 0.0 | — |
| 17 | 46.90 | 18.54 | 34.55 | 380 | 37.5 | 32 |
| 18 | 38.31 | 25.64 | 36.05 | 300 | 58.6 | 43 |
| 19 | 77.1 | 0.02 | 22.69 | 13000 | 0.0 | — |
| 20 | 74.81 | 2.25 | 22.94 | 3000 | 0.0 | — |
| 21 | 64.39 | 6.79 | 28.82 | 870 | 0.0 | 3 |
| 22 | 53.32 | 12.37 | 34.31 | 470 | 0.0 | 9 |
| 23 | 44.06 | 19.92 | 36.01 | 300 | 47.4 | 37 |
| 24 | 36.58 | 26.68 | 36.74 | 240 | 71.4 | 44 |
| 25 | 64.12 | 0.47 | 35.41 | 1800 | 0.0 | — |
| 26 | 45.13 | 0.07 | 54.80 | 5000 | 0.0 | — |
| 27 | 61.04 | 0.52 | 38.44 | 1800 | 0.0 | — |
| 28 | 70.78 | 2.86 | 26.35 | 1500 | 0.0 | — |
| 29 | 64.02 | 6.74 | 29.24 | 750 | 0.0 | — |
| 30 | 53.55 | 11.96 | 34.49 | 390 | 58.3 | 26 |
| 31 | 43.51 | 19.65 | 36.84 | 540 | 59.5 | 38 |
| 32 | 36.50 | 25.39 | 38.11 | 230 | 78.6 | 47 |
| 33 | 41.35 | 0.07 | 58.59 | 990 | 0.0 | — |
| 34 | 56.67 | 0.59 | 42.75 | 930 | 0.0 | — |
| 35 | 66.35 | 3.31 | 30.34 | 930 | 0.0 | 10 |
| 36 | 61.13 | 7.15 | 31.72 | 490 | 44.4 | 34 |
| 37 | 52.86 | 12.13 | 35.01 | 350 | 57.1 | 44 |
| 38 | 45.20 | 17.40 | 37.40 | 260 | 6.4 | 23 |
| 39 | 42.38 | 0.09 | 57.54 | 350 | 0.0 | 22 |
| 40 | 54.03 | 1.34 | 44.63 | 390 | 19.4 | 35 |
| 41 | 59.64 | 5.69 | 34.67 | 260 | 61.7 | 45 |
| 42 | 54.11 | 9.69 | 36.20 | 210 | 80.0 | 46 |
| 43 | 47.52 | 14.64 | 37.85 | 180 | 8.3 | 27 |
| 44 | 51.20 | 0.20 | 48.60 | 290 | 0.0 | 26 |
| 45 | 54.15 | 2.70 | 43.16 | 360 | 46.4 | 34 |
| 46 | 56.78 | 8.87 | 34.35 | 270 | 65.9 | 44 |
| 47 | 48.63 | 14.91 | 36.46 | 200 | 82.4 | 44 |
| 48 | 41.41 | 20.87 | 37.72 | 180 | 40.4 | 39.5 |
| 49 | 49.94 | 16.36 | 33.70 | 220 | 28.3 | 30 |
| 50 | 48.94 | 18.60 | 44.63 | 290 | 13.3 | 27 |
| 51 | 48.17 | 19.75 | 34.67 | 320 | 64.4 | 42 |
| 52 | 49.87 | 13.86 | 36.27 | 180 | 65.2 | 41.5 |
| 53 | 49.92 | 14.25 | 35.82 | 190 | 58.3 | 40.5 |
| 54 | 50.63 | 14.69 | 34.67 | 200 | 44.0 | 36.5 |
| 55 | 52.85 | 14.19 | 32.96 | 230 | 54.2 | 43 |
| 56 | 50.38 | 12.48 | 37.13 | 210 | 51.0 | 43.5 |
| 57 | 51.50 | 11.32 | 37.18 | 200 | 66.0 | 44 |
| 58 | 50.52 | 12.54 | 36.93 | 190 | 67.3 | 44 |
| 59 | 51.29 | 11.93 | 36.78 | 200 | 47.7 | 32 |
| 60 | 49.22 | 14.99 | 35.79 | 290 | 50.0 | 39 |
| 61 | 48.91 | 14.04 | 37.04 | 230 | 53.5 | 44 |
| 62 | 47.97 | 14.31 | 37.72 | 190 | 58.7 | 42.5 |
| 63 | 49.18 | 13.09 | 37.74 | 180 | 0.0 | 0.0 |

TABLE 2a

| | Process Parameters | | | | |
|---|---|---|---|---|---|
| Sample # | Power (Watts) | Reel Speed (mm/sec) | Mini-Chamber Pressure (mTorr) | Oxygen Flow Rate SCCM | In Situ Reflectivity (% at 830 nm) |
| 64 | 1000 | 33.0 | 1.11 | 0.0 | 50.4 |
| 65 | 1000 | 29.9 | 1.15 | 2.0 | 49.0 |
| 66 | 1000 | 24.5 | 1.17 | 4.0 | 50.2 |
| 67 | 1000 | 20.0 | 1.20 | 6.0 | 51.3 |
| 68 | 1000 | 16.0 | 1.23 | 8.0 | 49.8 |
| 69 | 1000 | 12.5 | 1.24 | 10.0 | 50.5 |

TABLE 2b

| | Optical Measurements at 830 nm | | | | | |
| --- | --- | --- | --- | --- | --- | --- |
| | Static | | | Laser Write | Dynamic | |
| Sample # | Reflectivity (%) | Transmission (%) | Absorption (%) | Sensitivity (nanoseconds) | Modulation Depth (%) | Carrier-to-Noise (dBs) |
| 64 | 45.32 | 19.14 | 35.54 | 290 | 55 | 43 |
| 65 | 48.07 | 13.93 | 38.00 | 200 | 63 | 45 |
| 66 | 50.25 | 13.55 | 36.20 | 200 | 71 | 45 |
| 67 | 48.26 | 16.47 | 35.28 | 230 | 71 | 44 |
| 68 | 48.85 | 16.69 | 34.19 | 260 | 56 | 43 |
| 69 | 38.66 | 27.46 | 33.88 | 360 | 44 | 33 |

Example (Polycarbonate Substrate)

A 13.5-inch wide web coating machine was used to sputter deposit a soft metal alloy onto polymeric substrate materials. The sputtering target (5"×15.5"×0.25") consisted of an alloy, in percentage by weight, of Sn (70), Bi (25), and Cu (5). The substrate was 130 mm wide, 5 mil thick polycarbonate cast film. This film was embossed with 1300 A" high features. A 5" square uniformity shield was installed in the minichamber to limit the metallization to the embossed regions of the film.

The chamber was evacuated to about a pressure of $1 \times 10^{-5}$ Torr, then back-filled with argon gas to a pressure of about $2.04 \times 10^{-5}$ Torr, and then with oxygen gas to a total pressure of about $2.57 \times 10^{-3}$ Torr. A DC power of 390 watts at 429 volts and 0.88 amps was applied to the magnetron sputtering source. The substrate was translated in front of the sputtering source at a rate of 8 mm/sec so as to allow for a coating of the alloy to be deposited onto the substrate.

Example (Subbing Layer)

A 13.5-inch wide web coating machine was used to sputter deposit the soft metal alloy onto polymeric substrate materials. The sputtering target (5"×15.5"×0.25") consisted of an alloy, in percentage by weight, of Sn (70), Bi (25), and Cu (5). The substrate was a 10 mil PET film with a cured, UV acrylic subbing hardcoat on the surface. The plastic sheet was formed in a clean environment to give optically clean materials.

The chamber was evacuated to about a pressure of $1 \times 10^{-5}$ Torr, then back filled with argon gas a pressure of about $2.06 \times 10^{-3}$ Torr, and then with oxygen gas to a total pressure of about $2.57 \times 10^{-3}$ Torr. A DC power of 920 watts at 489 volts and 1.85 amps was applied to the magnetron sputtering source. The substrate was translated in front of the sputtering source at a rate of 16 mm/sec so as to allow for a coating of the alloy to be deposited onto the substrate.

What is claimed is:

1. A medium for storage of information through ablative writing by a laser that can be optically read comprising a solid substrate having a highly reflective soft metal layer adhered to at least one surface thereof, said soft metal layer comprising both a reflective and recording layer and being an alloy consisting essentially of about 25 to about 90 percent by weight tin, about 8 to about 60 percent by weight bismuth, and about 1 to about 25 percent by weight copper wherein said soft metal layer is in a sufficiently uniform, partially oxidized form to increase the C/N ratio and modulation depth of the layer after laser writing and said soft metal layer is substantially free of bismuth-rich dendrites.

2. The medium of claim 1 wherein the percentage of tin is from about 55 to about 80, the percentage of bismuth is from 20 to 35, and the percentage of copper is from 3 to 10.

3. The medium of claim 1 wherein said substrate is a flexible plastic tape.

4. The medium of claim 1 wherein said substrate is a plastic disc.

5. The medium of claim 1 wherein said substrate is a plastic card.

* * * * *